United States Patent [19]

Koziol et al.

[11] Patent Number: 4,520,678
[45] Date of Patent: Jun. 4, 1985

[54] SMALL LINE-SIZE VORTEX METER

[75] Inventors: Stanislaw Koziol, North Attleboro; George E. Sgourakes, Millis, both of Mass.

[73] Assignee: The Foxboro Company, Foxboro, Mass.

[21] Appl. No.: 531,561

[22] Filed: Sep. 13, 1983

[51] Int. Cl.³ .............................................. G01F 1/32
[52] U.S. Cl. ................................................. 73/861.24
[58] Field of Search ....................... 73/861.22, 861.24

[56] References Cited

U.S. PATENT DOCUMENTS 3,796,095 3/1974 Fussell, Jr. ...................... 73/861.24
4,085,614 4/1978 Curran et al. ................... 73/861.24
4,134,296 1/1979 Kastner ........................... 73/861.22

Primary Examiner—Charles A. Ruehl
Attorney, Agent, or Firm—H. M. Bollinger; J. H. Wu; T. Martin

[57] ABSTRACT

A small line-size vortex meter comprising a small-diameter flow tube cast with an integral vortex-shedding bar and an external sensor housing. The outer surface of the housing is formed with an approximately circular recess extending towards the flow tube and communicating with the interior of the tube through side-by-side impulse ports located adjacent one end of the vortex-shedding bar. Inserted into the central region of the recess is a sensor body having diaphragms on opposite sides to respond to vortex pressure fluctuations transmitted through the impulse ports to chambers along the sides of the sensor body. The sensor body comprises an oil-filled capsule with the diaphragms serving to transmit the pressure fluctuations to a piezo-electric sensor element which produces corresponding electrical signals.

17 Claims, 9 Drawing Figures

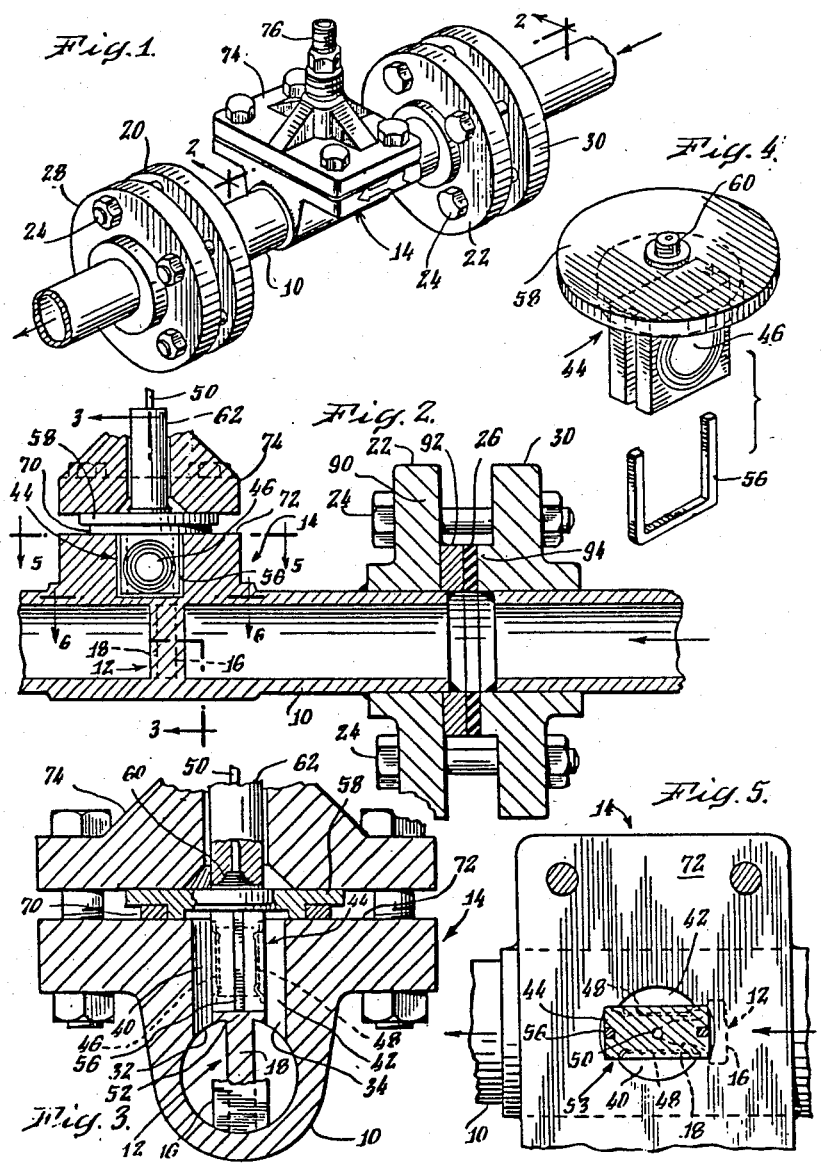

SMALL LINE-SIZE VORTEX METER

BACKGROUND OF THE INVENTION

1. Field of the Invention

This invention relates to fluid flow measuring apparatus. More particularly, this invention relates to such apparatus of the vortex-shedding type employed to measure the velocity of liquid or gas flow through a pipe.

2. Description of the Prior Art

It has been known for many years that vortices are developed in a fluid flowing past a non-streamlined obstruction. It also has been known that with certain arrangements the vortices are developed by alternately shedding at regular intervals from opposite edges of the obstruction to form corresponding rows of vortices. Such vortices establish a so-called von Karman "vortex street", which is a stable vortex formation consisting of two nearly-parallel rows of evenly-spaced vortices travelling with the flow stream.

In a von Karman vortex street, the vortices of one row are staggered relative to those of the other row by approximately one-half the distance between consecutive vortices in the same row. The spacing between successive vortices in each row is very nearly constant over a range of flow rates, so that the frequency of vortex formation is correspondingly proportional to the velocity of the fluid. Thus, by sensing the frequency of vortex shedding it is possible to measure the fluid flow rate. Devices for that purpose are often referred to as vortex meters.

Various types of vortex meters have been available commercially for a number of years. Such meters basically comprise a vortex-shedding body mounted in a flow tube together with a sensor for detecting the vortex pressure fluctuations. Commonly, the vortex shedding body has a blunt surface facing the oncoming fluid. One type of sensor which has been highly successful employs a piezoelectric crystal to detect the vortex pressure fluctuations and to produce corresponding electrical pulses. Preferably, such crystal is mounted in a sealed oil-filled cavity which receives the pressure fluctuations through flexible metallic diaphragms. A particularly suitable arrangement of this type is disclosed in U.S. Pat. No. 4,085,614 (Curran et al).

The piezo-electric sensor shown in FIG. 6 of the above Curran et al patent is located directly behind the vortex-shedding surfaces of the blunt body which, as is usual, extends perpendicularly across the full diameter of the flow tube. Although this configuration has found substantial commercial success, it is primarily suitable for relatively large-sized meters, e.g. having flow tubes 2″ in diameter and above. For small-diameter flowmeters, i.e. so-called small line-sized meters having flow tubes of about 1.5″ or less in diameter, it clearly is preferable to mount the sensor outside of the flow tube.

It has previously been proposed to mount at least portions of a vortex sensor outside of the flow tube. For example, in FIG. 13 of the above Curran et al patent, the piezo-electric crystal element is located outside of the flow tube, and receives pressure pulses through capillary-sized conduits connected to respective diaphragm-sealed chambers in the interior of the vortex-shedding body. Such an arrangement however has been found not to be fully satisfactory, especially because the capillary conduits attenuate the pressure pulse signals sufficiently to prevent high-level performance.

U.S. Pat. No. 3,722,273 provides another showing of a vortex meter having a sensor element located outside of the flow tube. A thermal "hot-wire" sensor element receives fluid pressure signals through small conduits connected to opposite sides of a chamber formed inside the vortex-shedding body. Other sensor configurations of that general type are disclosed in FIGS. 16–18 of U.S. Pat. No. 3,777,563. The sensor arrangements described in the latter two patents however suffer from important practical disadvantages making them unacceptable as solutions to the problem addressed by the present invention.

SUMMARY OF THE INVENTION

In one preferred embodiment of this invention, to be described hereinbelow in detail, a line-sized vortex meter is provided comprising a small-diameter flow tube with a vortex-shedding element in the form of an elongate bar of generally T-shaped cross-section. The vortex-shedding bar is mounted perpendicular to the direction of fluid flow, with its ends integral with the wall of the flow tube. The blunt surface of the vortex shedder (i.e. the top of the "T") faces upstream, and the tail segment extends downstream.

Adjacent one end of the vortex-shedding bar, the wall of the flow tube is apertured to form two large-area impulse ports symmetrically disposed about the opposite sides of the tail segment of the bar. These ports are approximately semi-circular in cross-section and define the ends of corresponding pressure chambers of the same cross-sectional shape located in an external sensor housing integral with the wall of the flow tube.

The vortices shed from the edges of the bar develop strong pressure pulses adjacent the impulse ports in the flow tube wall. These pulses are conducted through the impulse ports and into the respective pressure chambers without significant attenuation.

Mounted between these two pressure chambers is a sensor body fitted with a pair of flexible diaphragms each exposed to one of the chambers. These diaphragms are part of a sealed and oil-filled capsule carrying a piezo-electric crystal arranged to produce electrical signals responsive to differential pressure signals applied to the diaphragms. The piezo-electric crystal responds to the vortex-induced pressure fluctuations in the pressure chambers to develop suitably strong electrical pulses corresponding to the shedding of vortices in the flow tube, and capable of producing an accurate flow measurement signal over a wide range of flow rates and conditions.

A further advantage of the described arrangement is that the external sensor body can readily be removed from the flowmeter, as for maintenance or replacement. By using a meter by-pass loop, such removal may be made in the field. The diaphragms are effectively isolated from the flow of the process fluid, and thus are not subject to erosion from particles in the fluid. The flowmeter to be described can be used for liquid, gas or steam measurements.

Accordingly, it is an object of the invention to provide an improved vortex meter of small size. Another object of the invention is to provide such a flowmeter which is capable of accurate measurements under a variety of conditions, and which nevertheless can be manufactured at modest cost. Still other objects, aspects and advantages of the invention will in part be pointed out in, and in part apparent from, the following detailed description of a preferred embodiment, considered together with the accompanying drawings.

BRIEF DESCRIPTION OF THE DRAWINGS

FIG. 1 is a perspective view of a flowmeter constructed in accordance with this invention;

FIG. 2 is a vertical section taken along line 2—2 of FIG. 1;

FIG. 3 is a cross-section taken along line 3—3 of FIG. 1;

FIG. 4 is a perspective view of the sensor body;

FIG. 5 is a horizontal section taken along line 5—5 of FIG. 2;

DESCRIPTION OF THE PREFERRED EMBODIMENT

Figure 6:
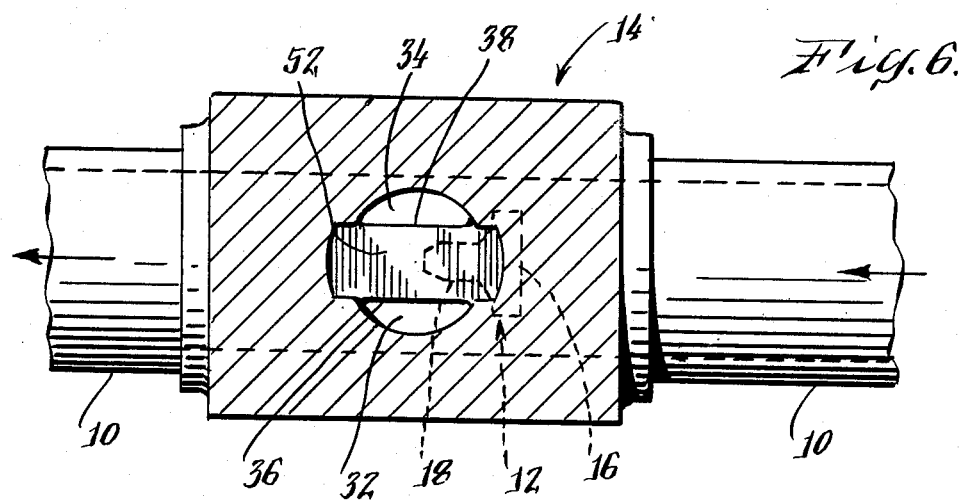
FIG. 6 is a horizontal section taken along line 6—6 of FIG. 2.

A flowmeter in accordance with the present invention is shown in perspective in FIG. 1. Referring also to FIGS. 2 and 3, the flowmeter basically comprises a small-diameter flow tube 10, e.g. 1" in diameter, which is cast integrally with a vertical vortex-shedding element 12 and an external sensor housing 14. The vortex-shedding element is an elongate bar-like member having a generally T-shaped cross-section, as indicated in dotted outline in FIG. 5. The top of the "T" forms a surface 16 facing the oncoming fluid; the remainder of the bar comprises a tail segment 18 extending downstream. (Detailed aspects of a vortex-shedding body of this general type are set forth in U.S. Pat. No. 4,085,614, issued to John R. Curran et al on Apr. 25, 1978.)

The flow tube 10 carries mounting flanges 20 and 22 at its ends. The flanges, which will be described in more detail hereinbelow, are adapted for attachment with bolts 24 and gasketing 26 to corresponding flanges 28 and 30 forming part of the fluid flow system to be monitored.

Referring now particularly to FIG. 3, the top wall of the flow tube 10 is apertured in two places at 32, 34 adjacent the upper end of the vortex-shedding bar 12 so as to form two large-area impulse ports. Referring also to FIG. 6, these apertures as seen in cross-section are equal-area segments of a circle, approximately semicircular. Upstream portions of the chords 36, 38 of the segments are located symmetrically along and parallel to the respective side surfaces of the tail segment 18 (as projected onto the plane of FIG. 6); the remaining chord portions extend a short distance further downstream beyond the end of the tail segment. The segment chords in the preferred embodiment are about ⅝" in length, and the height of each segment about 3/16".

With reference again to FIG. 3, the impulse ports 32, 34 define the lower ends of a corresponding pair of pressure chambers 40, 42 which extend a substantial distance up (vertically) away from the flow tube 10 and into the sensor housing 14. These pressure chambers are sealed at their upper ends. Preferably, as shown in FIG. 5, the cross-sectional shape and dimensions of these pressure chambers are the same as the shape and dimensions of the impulse ports, in this case approximately semi-circular segments of a circle.

Mounted between the pressure chambers 40, 42 is a sensor body 44 (see also FIG. 4). This body is generally rectangular in shape, and is fitted with flexible metal diaphragms 46, 48 respectively facing the pressure chambers 40, 42. These diaphragms form side walls of a capsule providing an oil-filled, sealed cavity. A piezoelectric crystal (not shown) is mounted within this cavity to produce electrical signals responsive to differential pressure signals applied to the diaphragms.

Fluid flow past the vertical bar-like member 12 results, in known fashion, in the shedding of two generally parallel rows of evenly-spaced but staggered sets of vortices travelling with the fluid flow stream. These vortices have been found to develop strong pressure pulses adjacent the impulse ports 32, 34. Such pressure pulses pass through the ports and are conducted directly into the dead-end regions defined by the pressure chambers 40, 42 where they are applied alternately, as differential pressure pulses, to the flexible diaphragms 46, 48.

These differential pressure pulses are applied to the piezo-electric crystal in the sensor body 44, and this crystal in turn develops corresponding electrial signals. These electrical signals are picked up by conventional electrodes on the side walls of the crystal, as described in the above Curran et al patent, and are conducted out of the sensor body to a coaxial cable 50. This cable leads to appropriate electronic signal-conditioning circuitry (not shown) functioning in known manner to produce a measurement signal adapted for use in an industrial process instrumentation system.

The signals produced by the piezo-electric crystal are quite intense, relatively speaking, and especially considering the small size of the various flowmeter elements involved. Such intense signals result from that fact that strong pressure pulses are developed at the diaphragms 46, 48. This in turn results in part from the provision of impulse ports 32, 34 having large cross-sectional areas and from the use of corresponding cross-sectional areas for the pressure chambers 40, 42. Further improvement is effected by the design characteristic providing a very short distance between the impulse ports and the diaphragms 46, 48. In the preferred embodiment, the spacing between the impulse ports and the bottom of the sensor body 44 is about as small as it can be, e.g. the thickness of the flow tube wall strip 52 is only about 0.1" or so.

Referring again to FIG. 5, the sensor housing 14 is formed at the time it is cast with a recess generally indicated at 53 which overall is generally circular in cross-section but which includes an overlapping rectangular sector into which the sensor body 44 is fitted. This sensor body is a self-contained unit, having all of the necessary components to sense differential pressure pulses and to produce corresponding electrical signal pulses. An important advantage of the flowmeter construction is that the sensor body can easily be removed for maintenance or repair work.

Referring also to FIG. 4, the sensor body is formed along the two side edges and the bottom edge with a groove 54 carrying a U-shaped gasket 56. This gasket ensures that the two pressure chambers 40, 42 are effectively pressure-isolated from one another, so as to prevent loss of pressure pulse intensity through leakage around the edges of the sensor body.

Secured to the upper part of the sensor body 44 is a round sealing plate 58 carrying a stepped fitting 60. A rigid tube 62 is welded to this fitting to provide protection for the connection elements (not shown) used to bring the electrical signals out from the piezo-electric crystal to the coaxial cable 50. A circular gasket 70 (FIG. 3) is positioned between the round plate 58 and the upper sealing surface 72 of the sensor housing 14. A rectangular mounting plate 74 is bolted down on top of the round plate 58 to apply substantial force pressing the plate 58 and its gasket 70 against the sealing surface 72, to assure proper seal-off of the process fluid at the upper ends of the pressure chambers 40, 42. The plate 74 also carries a mounting post 76 to support electronic components of the flow meter (not shown herein).

Figure 7:
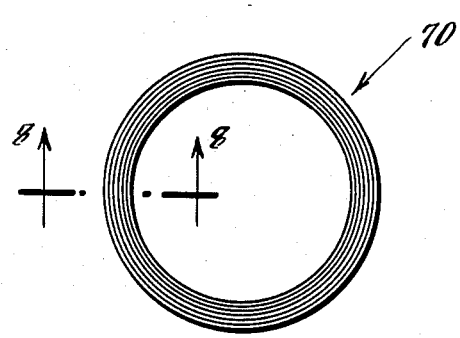
FIG. 7 is a plan view of a sealing gasket used in the flowmeter.
Figure 8:
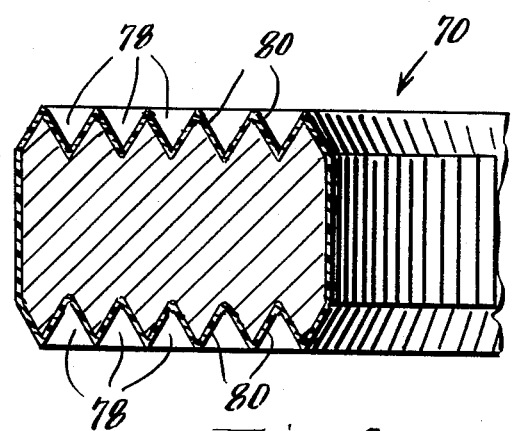
FIG. 8 is a cross-section of the gasket of FIG. 7.

It has been found that the gasket 70 preferably is constructed as shown in FIGS. 7 and 8, to insure highly effective sealing. This gasket is made of metal, e.g. stainless steel, and is serrated on its top and bottom surfaces with separate circular V-grooves 78, advantageously in the range of 0.012" to 0.018" in depth, with a preferred depth of 0.015". The width of the grooves between the outer tips may be about 0.014" to 0.022". The top and bottom surfaces of the gasket (i.e. the V-grooves) are covered with a very thin coating 80 of polytetrafluoroethylene material (which is typically sold under the trademark "Teflon"), e.g. to a thickness less than 20% of the groove depth, and preferably to a thickness of about 0.001" to 0.002" in the embodiment shown here.

Figure 9:
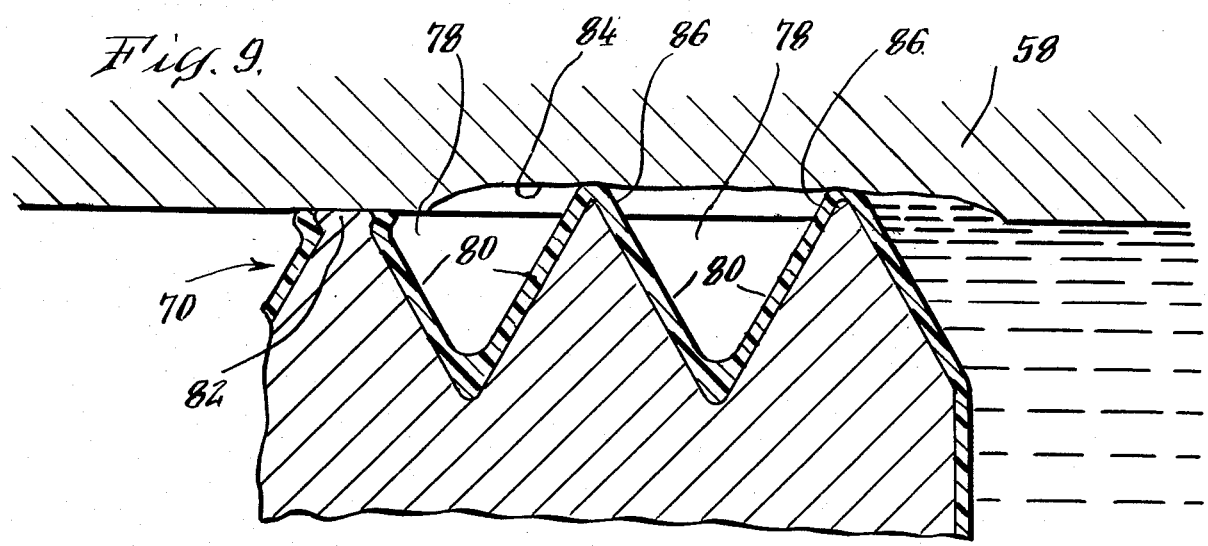
FIG. 9 shows a cross-section of the gasket of FIG. 7 after sealing pressure has been applied.

When sealing force is applied by the mounting plate 74, the sharp-edged pointed tops of the V-grooves 78 bite into the adjoining metal surfaces. By applying sufficient force, the tips of the V-grooves will be crushed to some extent, as indicated pictorially at 82 in FIG. 9. For example, the original groove depth of 0.015" may be reduced to possibly 0.012", or even less.

With such crushing action, the "Teflon" coating 80 will tend to be redistributed somewhat into the remaining portions of the V-grooves. If there is a radial imperfection in the adjoining surface, such as a radial scratch or tool mark 84, the "Teflon" on the pointed groove top can extend into such imperfection (as shown at 86) to engage the adjacent metal part. Such sealing off of radial cracks or fissures will effectively prevent leakage of the process fluid from the pressure chambers 40, 42 to the outside.

The metal for the gasket can be selectively chosen for compatibility with the process fluid. Multiple convolutions (five in the disclosed example) provide multiple isolation barriers to enhance the sealing. Teflon plastic is preferred because it is resistant to nearly all chemical and solvents. Gaskets in accordance with this disclosure have been found capable of effective sealing not only at room temperature but also after temperature cycling (between 50°-400° F.) at 2300 psi, a test resulting in failure of conventional gaskets.

This gasket construction is particularly beneficial in that the plastic coating (preferably "Teflon") is able to seal surface imperfections created by tool marks or improper handling when the gasket is installed for the first time, or when it is being replaced. The V-groove convolutions cause no damage to the sealing surfaces of the adjacent parts after sealing pressure is applied.

When making measurements of certain types of process fluids, it is important to insure that the process fluid comes into contact only with a high chrome stainless steel metal (such as the product available under the trademark "Hastelloy") which is highly resistant to corrosion and the like. Heretofore, for that purpose, metering flow tubes and their end flanges have been formed entirely of Hastelloy. However, that approach has not been fully satisfactory because Hastelloy is very expensive. This problem has been solved by another aspect of the present disclosure.

More specifically, and referring again to FIGS. 1 and 2, in the present embodiment the flow tube 10 is formed of Hastelloy, whereas the main flange bodies 90 (i.e. the portions through which the bolts 24 pass) are formed of stainless steel, or some other material less expensive than Hastelloy. To meet corrosion resistance requirements, a generally circular ring or band of Hastelloy 92 is welded to the outer ends of the main flange bodies and to the flow tube. This Hastelloy ring surrounds the flow tube opening, and slightly overlaps the ends of the tube as seen in FIG. 2. Thus, the process fluid will contact only Hastelloy, yet the cost is substantially reduced because most of each flange is formed of relatively inexpensive material. In the particular construction shown, the Hastelloy rings form raised surfaces for the flanges, and match correspondingly raised surfaces 94 of the Hastelloy flanges 28, 30 of the fluid flow system to be monitored.

Accordingly, it will be understood that the flowmeter described hereinabove incorporates important advantageous features. Such a flowmeter provides accurate flow measurements, with substantially linear output characteristics. A sensor body of one size can readily be used with a range of line sizes, e.g. for flow tubes of either 1" or 1.5" diameter, without changing the sensor body size. The large-area impulse ports, close to the sensor body diaphragms, assure intense pressure pulses, and provide for rapid self-purging in the event air bubbles or the like become lodged in the ports or the associated pressure chambers. The signals produced by the sensor element are suitably intense, making possible the use of conventional electronic techniques for developing the final measurement output signal.

Although a preferred embodiment of this invention has been described hereinabove in detail, it is desired to emphasize that this has been for the purpose of illustrating the invention, and should not be considered as necessarily limitative of the invention, it being understood that many modifications can be made by those skilled in the art while still practicing the invention claimed herein.

What is claimed is:

1. Flow-metering apparatus of the type comprising a flow tube having a vortex-shedding element to produce vortices at a rate corresponding to the fluid flow rate;
    an external housing integral with said flow tube and formed with a pair of pressure chambers;
    the wall of said flow tube being apertured adjacent said vortex-shedding element to form a pair of side-by-side large-area impulse ports located to receive differential pressure fluctuations developed by said vortices;
    said impulse ports communicating directly with said pressure chambers respectively and providing for the delivery of vortex pressure energy into said chambers without excessive attenuation;
    diaphragm means in said housing responsive to said differential pressure fluctuations and forming part of a sealed cavity having a liquid fill; and
    a sensor element responsive to pressure fluctuations transmitted through said diaphragm means and operable to produce corresponding flow measurement signals.

2. Apparatus as claimed in claim 1, including a sensor body having said sensor element therewithin and positioned between said pressure chambers with said diaphragm means as wall means thereof.

3. Apparatus as claimed in claim 2, wherein said housing is formed with a recess extending from an external surface down towards said flow tube and into which said sensor body is inserted and readily removed;
said recess being formed to provide said pressure chambers on opposite sides of said sensor body.

4. Apparatus as claimed in claim 2, wherein said vortex-shedding element is a bar-like member extending across said flow tube;
said housing being located adjacent one end of said vortex-shedding element.

5. Apparatus as claimed in claim 4, wherein said vortex-shedding element comprises a portion extending in a direction parallel to the fluid flow;
said impulse ports being located on opposite sides of said portion of said vortex-shedding element.

6. Apparatus as claimed in claim 5, wherein said vortex-shedding element comprises a blunt portion facing the oncoming fluid;
said extending portion comprising a tail segment integral with said blunt portion.

7. Apparatus as claimed in claim 2, wherein the cross-sectional areas of said pressure chambers correspond in size and shape to the openings formed by said impulse ports.

8. Apparatus as claimed in claim 7, wherein the openings formed by said impulse ports are approximately semi-circular in shape;
parallel chords of said semi-circular shapes, effectively equivalent to diametral axes, being positioned adjacent but spaced apart from one another, with both extending in a direction parallel to the longitudinal axis of said flow tube.

9. Apparatus as claimed in claim 8, wherein one end of said vortex-shedding element has a portion the projection of which onto the wall of said flow tube adjacent said one end is located between said parallel chords.

10. Apparatus as claimed in claim 9, wherein said one end portion is a tail segment extending downstream from a blunt portion facing the oncoming fluid.

11. Apparatus as claimed in claim 8, wherein the cross-sectional areas of said pressure chambers are semi-circular in shape, matching the shapes of said impulse port openings;
the diametral axes of said semi-circular chambers being defined by the opposite faces of said sensor body.

12. Apparatus as claimed in claim 11, wherein said pressure chambers are elongate in a direction extending away from said flow tube and into said external housing;
the axes of said pressure chambers in said direction being parallel to one another and perpendicular to the direction of fluid flow through said flow tube.

13. Flow-metering apparatus of the type comprising a flow tube having a vortex-shedding element to produce vortices at a rate corresponding to the fluid flow rate;
an external sensor housing integral with said flow tube;
said sensor housing having an outer sealing surface formed with an opening defining a sensor recess extending from said surface down towards said flow tube and communicating with the interior of said tube to provide for transmission of vortex pressure fluctuations into said recess;
a removable self-contained sensor body extending into a central region of said sensor recess, the remainder of said recess defining pressure chambers on opposite sides of said sensor body;
a pair of diaphragms on said opposite sides of said sensor body to transmit said pressure fluctuations to a sensor element in said body and thereby to produce corresponding flow signals; and
means for providing a fluid-tight seal between the outer end of said sensor body and said sealing surface.

14. Apparatus as claimed in claim 13, wherein said sensor body is generally rectangular in shape and formed with a continuous groove running along two side edges and the bottom edge; and
a gasket in said groove to provide effective isolation between said pressure chambers while permitting the sensor body to be withdrawn easily for maintenance or repair.

15. Apparatus as claimed in claim 13, wherein said sealing means comprises a sealing plate secured to the outer end of said sensor body, said plate extending out laterally beyond said sensor recess to over said sealing surface;
a sealing gasket between said sealing plate and said sealing surface; and
means applying force to said sealing plate to effect a fluid-tight seal at said gasket.

16. Apparatus as claimed in claim 15, wherein said gasket is ring-shaped and serrated on its top and bottom surfaces with V-notches.

17. Apparatus as claimed in claim 16, wherein said gasket is formed of metal; and
a thin plastic material coating the top and bottom surfaces of said gasket.

* * * * *